UNITED STATES PATENT OFFICE.

CHARLES HOWARD, OF NEW YORK, N. Y., ASSIGNOR TO NATIONAL LUMBER VULCANIZING CORPORATION, A CORPORATION OF DELAWARE.

VULCANIZED WOOD.

1,021,676.    Specification of Letters Patent.    Patented Mar. 26, 1912.

No Drawing.    Application filed October 11, 1909.   Serial No. 522,193.

*To all whom it may concern:*

Be it known that I, CHARLES HOWARD, a citizen of the United States, residing at New York, in the county of New York and State of New York, have invented certain new and useful Improvements in Vulcanized Woods, of which the following is a specification.

My invention relates to improvements in vulcanized woods, and it consists in the products herein described and claimed.

An object of my invention is to provide an improved vulcanized wood, which is thoroughly dried and hardened throughout, with its fibers intact from distortion and disruption and efficiently protected from the absorption of moisture, thereby insuring an unwarped product which will maintain its shape under severe practical use.

A further object of my invention is to provide an improved vulcanized wood, in which the hardened and undecomposed resins are uniformly disposed throughout the fibers of the entire mass; thereby providing a uniform, close-grained product capable of a high polish, and which will efficiently resist all deterioration and rotting through the absorption of moisture.

My invention provides a product of uniform vulcanization throughout, which is especially adapted for advantageous use under conditions in which exposure to the elements renders liable the accumulation and retention of water in cracks or cavities within the wood; such, for example, as in railway ties.

A further object of my invention is to provide an improved vulcanized wood free from all readily volatile matters, and deprived of pyroligneous acid without decomposition of its resins; thereby providing a durable product which will remain practically unchanged through long and severe use.

A preferred method of manufacturing my improved product is as follows: The wood under treatment is placed in an unheated condition in a retort, and subjected to a progressively increasing vacuum which is gradually raised to a maximum of approximately 20 to 28 inches; thereby causing a gradual and complete evaporation of all moisture and the readily volatile matters without danger of distortion or disruption of the wood fibers. Steam, preferably below 230° F., is then admitted to the retort and maintained in contact with the wood for a sufficient time to thoroughly penetrate the latter and moisten and soften the fibers thereof; the wood being raised uniformly to the temperature of the steam. This step permits a further portion of the aqueous constituents of the wood to freely escape from the moistened and heated fibers; the resins being melted, and a portion of the pyroligneous acid removed by the steam. This step of my process is varied advantageously according to the character of the wood under treatment; the steam being either confined under pressure in the retort, or circulated either continuously or periodically through the retort under pressure. The steam is then exhausted from the retort, and the wood subjected to the combined action of a vacuum and of an increased degree of dry heat, preferably below 380° F., for a sufficient time to drive off the steam absorbed in the preceding step together with the remaining pyroligneous acid, and to distribute the resins without decomposition thereof uniformly throughout the mass of the wood. During the subjection of the wood to an increased heat, premature hardening of the outer layers is prevented by the escape outwardly therethrough of the steam previously absorbed throughout the entire mass of the wood; thereby producing a progressive drying from the interior outward and permitting the penetration and distribution of the undecomposed resins uniformly throughout the entire mass of the wood. The supply of heat is then cut off and the wood gradually cooled under a vacuum. During this step, the relatively highly heated and thoroughly dried wood is subjected uniformly throughout its mass to a gradually decreasing temperature; thereby eliminating danger of cracking or strain due to distortion of the wood fibers, and insuring an even and uniform deposition of the resins on the fibers throughout the entire mass.

I have described a preferred and satisfactory method of manufacturing my improved product, but other methods may be employed, and my invention is entirely independent thereof.

The process herein described forms the subject matter of my application No. 522192, filed October 11, 1909.

Having thus described my invention, what I claim as new and desire to secure by Letters-Patent is:

1. The herein described product, comprising wood free from all volatile aqueous matters, and having its undecomposed resins deposited uniformly throughout the hardened fibers of the entire mass.

2. The herein described product, comprising wood deprived of pyroligneous acid, and having its undecomposed resins deposited uniformly throughout the hardened, undisrupted fibers of the entire mass.

3. The herein described product, comprising wood deprived of pyroligneous acid and free from all volatile aqueous matters, and having its resins disseminated in an undecomposed form uniformly throughout the entire mass.

4. The herein described product, comprising wood having its undisrupted fibers deprived of pyroligneous acid and uniformly impregnated with the hardened and undecomposed wood resins, thereby providing an improved vulcanized wood, which remains practically unchanged through long and severe use.

5. The herein described product, comprising wood free from all volatile aqueous matters, and having its gums and undecomposed resins deposited uniformly throughout the hardened fibers of the entire mass.

In testimony whereof I affix my signature in presence of two witnesses.

CHARLES HOWARD.

Witnesses:
C. A. BAKER,
G. AYRES.